R. R. Taylor.
Corn Harvester.
No. 24,164.  Patented May. 24, 1859.
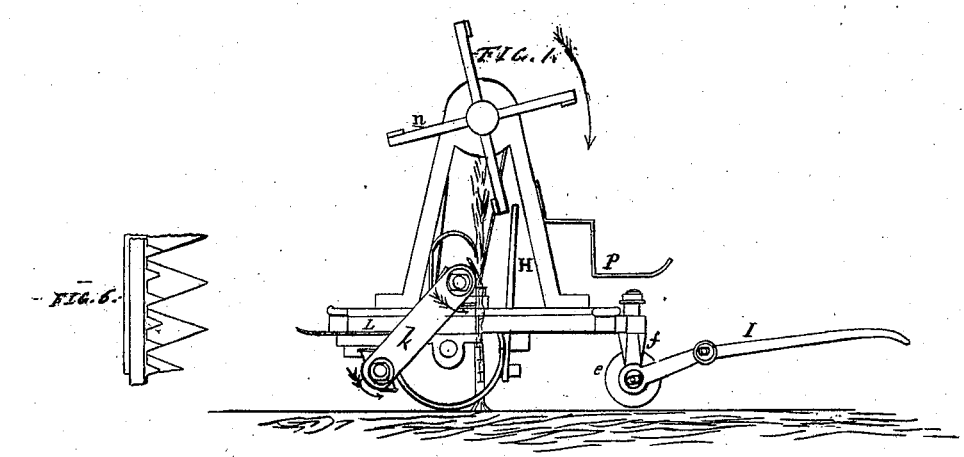
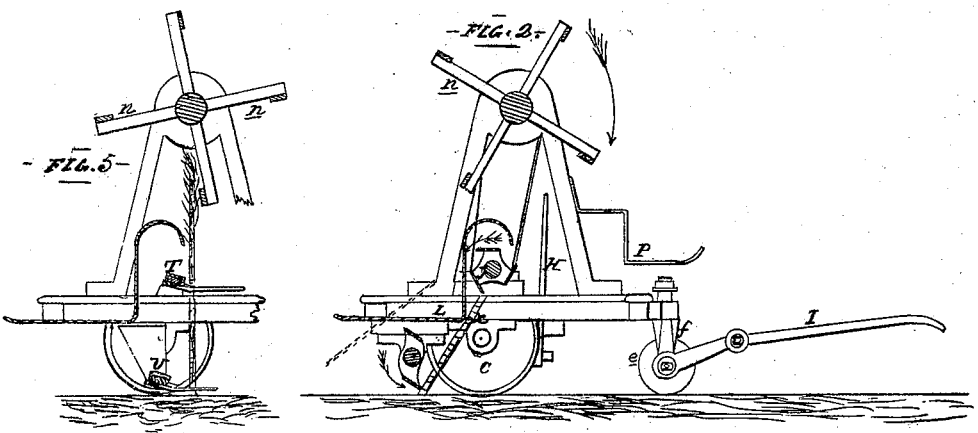
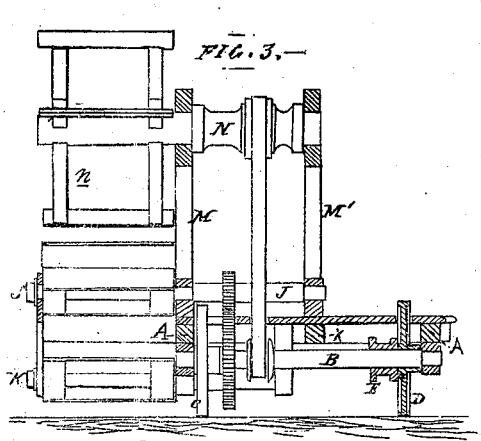
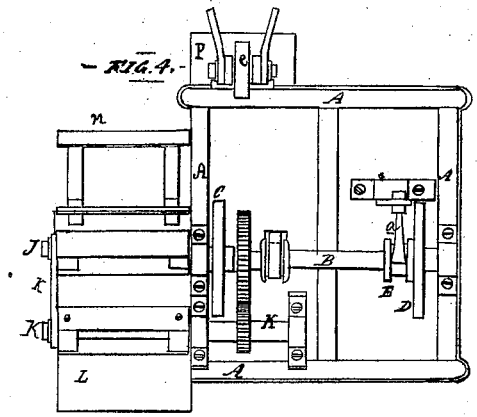
Witnesses: Henry Houston, Horace See
R. R. Taylor

UNITED STATES PATENT OFFICE.

ROBERT R. TAYLOR, OF READING, PENNSYLVANIA.

IMPROVEMENT IN SUGAR-CANE HARVESTERS.

Specification forming part of Letters Patent No. 24,164, dated May 24, 1859.

*To all whom it may concern:*

Be it known that I, ROBT. R. TAYLOR, of Reading, Berks county, Pennsylvania, have invented a new and Improved Sugar-Cane Harvester; and I do hereby declare the following to be a full, clear, and exact description of the same, reference being had to the accompanying drawings, and to the letters of reference marked thereon.

The nature of my invention consists in the employment of two sets of revolving cutters carried on a suitable frame, in combination with a reel and a shield, one set of the said cutters being situated above and in advance of the other set, and the whole being arranged substantially in the manner described hereinafter, so that on drawing the frame over the ground motion may be communicated to the cutters and to the reel. The latter thereby bend the tops of the canes over the shield, while they are severed by the upper set of revolving cutters, after which the canes, deprived of their tops, are severed near the bottom and deposited on the ground, ready to be carted away.

In order to enable others to make and use my invention, I will now proceed to describe its construction and operation.

On reference to the accompanying drawings, which form a part of this specification, Figure 1 is a side view of my improved sugar-cane harvester; Fig. 2, a sectional view; Fig. 3, a transverse sectional elevation. Fig. 4 is an inverted plan view, illustrating the machinery on the under side of the frame; Fig. 5, a detached sectional view of sufficient of the machine to illustrate a modified arrangement of cutters; Fig. 6, a plan of modified cutters.

Similar letters refer to similar parts throughout the several views.

A is the main frame of the machine, and in suitable boxes attached to the under side of this frame turns the main driving-shaft B, to which are secured the driving-wheels C and D. The former is secured permanently to the shaft; but the latter is hung loosely to and turns independently of the shaft, excepting when the clutch E is thrown into gear with the wheel, in which case the latter turns with the shaft and the driving-wheel C. This clutch E is arranged to slide backward and forward on the shaft B, and is operated by a projection, $a$, on the lever E, the long arm of which projects above the frame of the machine so as to be within reach of the driver. The front end of the frame is supported on a wheel, $e$, which turns in a bracket, F, hung to and arranged to swivel in the frame.

The shafts I, to which the horses are yoked and by which the machine is drawn over the ground, are hung to the pin on which the pulley $e$ turns. Two shafts, J and K, are arranged to turn, the former in boxes secured to the top of the frame and the latter in boxes secured to the under side of the frame. These shafts are driven by wheels, as illustrated in the drawings, or by any suitable system of gearing connected with the main driving-shaft B. The shafts extend beyond the frame of the machine, and their extreme ends are connected together by means of a link, K. The projecting portion of each shaft is furnished with sharp-edged knives, as best observed in Fig. 2, where it will also be seen that the shaft J is situated above and in advance of the shaft K. A shield, L, is secured to the side of the frame, covering the lower shaft, K, and its knives, and partially overlapping the upper shaft, J, and its knives. Between the upper and lower shaft the shield L has a projecting corner, $x$, the object of which will be made apparent hereinafter.

On the main frame are erected two standards, M and M', in the top of which turns the shaft N, and to the latter is secured the reel $n$, situated above the upper knife-shaft, J. The reel-shaft may be driven by a belt from the main driving-shaft B, or by any suitable system of gearing.

P is the driver's seat, secured to the front of the standards M and M' and above the main frame.

It should be understood that in cutting the sugar-cane in the field the practice is to first chop off the tops and then to sever the stalks at a point some six or eight inches above the ground. As the above-described machine is drawn over the ground a rapid rotary motion is imparted from the drawing-shaft B to the shafts J and K in the direction pointed out by the arrows, Fig. 2, at the same time the reel is caused to revolve slowly in the direction of its arrow. This reel bends the tops of the cane over the top of the shield, while the knives on the shaft J cut off the tops of the stalks, which fall into the shield, from whence they may be removed at suitable intervals and in the desired quantity. As the machine continues to move its projection *x* strikes the stalks already deprived of their tops and bends them down, as shown in Fig. 2, while the knives on the shaft K sever the bent stalks, and the latter fall to the ground.

When it becomes necessary to turn the machine round, the clutch E is thrown out of gear with the wheel D, when the entire machine can be turned with facility.

It has been already shown that the upper cutting-knives are situated and operate in advance of the lower ones. This is indispensable in my improved harvester, inasmuch as it is necessary that the stalks of the cane should remain firm while their tops are severed. This would not be the case if the upper and lower knives operated at the same time on the same stalks. By my arrangement the stalks are held firmly in the ground at the lower end and at the upper end are pressed against the shield L, so that while their tops are being cut off the stalks are in a temporary state of rigidity.

In severing the stalks near the ground, after the tops have been cut off, it is necessary that they should be bent slightly forward before the lower knives take effect, so that when the cutting takes place they will fall direct to the ground clear of the knives. This bending of the stalks is effected by the projection *x*, without the aid of which they would be apt to become entangled in the cutting apparatus and would be mangled and deposited on the ground at random, instead of falling in one uniform direction. Another end gained by the shield is that it receives the tops of the stalks which may, as before remarked, be deposited on the ground at intervals, thus separating the available portions of the cane from the refuse. The lower portion of the shield L may be made separate from the upper portion, and may be hinged to the frame and be made to tilt over at intervals, as shown in dotted lines, Fig. 2, thus rendering the depositing of the tops on the ground at intervals a part of the duty of the machine. Instead of this arrangement, the platform may be so constructed as to afford room for an attendant, who can bind the severed tops in bundles, ready to be carried away.

I claim and desire to secure by Letters Patent—

The two sets of rotating cutters, one set being situated above and in advance of the other set, in combination with the reel *n* and shield L, the whole being arranged substantially as and for the purpose herein set forth.

In testimony whereof I have signed my name to this specification in the presence of two subscribing witnesses.

R. R. TAYLOR.

Witnesses:
HENRY HOWSON,
CHAS. E. FOSTER.